F. SCHULZE.
POTATO DIGGER.
APPLICATION FILED MAR. 17, 1911.
997,013.
Patented July 4, 1911.
2 SHEETS—SHEET 1.
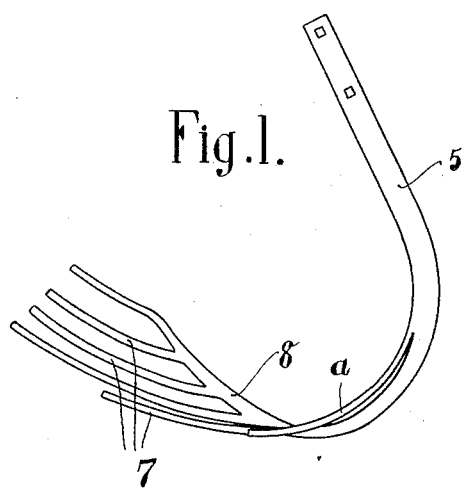
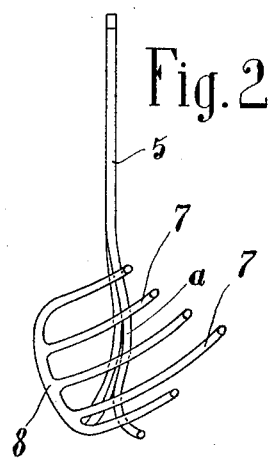
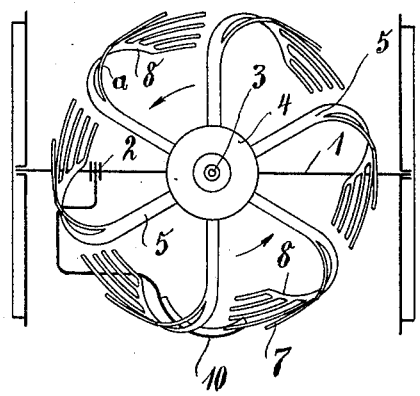

F. SCHULZE.
POTATO DIGGER.
APPLICATION FILED MAR. 17, 1911.

997,013.

Patented July 4, 1911.

2 SHEETS—SHEET 2.

UNITED STATES PATENT OFFICE.

FRIEDRICH SCHULZE, OF HAMBURG, GERMANY.

POTATO-DIGGER.

997,013.  Specification of Letters Patent.  Patented July 4, 1911.

Application filed March 17, 1911. Serial No. 615,067.

*To all whom it may concern:*

Be it known that I, FRIEDRICH SCHULZE, a subject of the Emperor of Germany, residing at Hamburg, in Germany, have invented a certain new and useful Improvement in Potato-Diggers, of which the following is a specification.

This invention relates to potato-diggers of the class wherein an appliance revolving behind the plow receives and deposits the potatoes.

The invention consists in an improved construction of the said appliance, designed to effect an efficient separation of the tubers from the larger stalks and weeds and adhering earth, prior to depositing them.

The invention is illustrated in the annexed drawing, in which—

Figure 4:
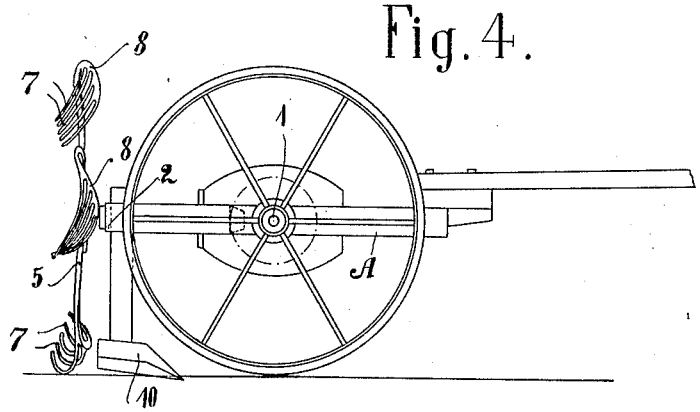
Figure 5:
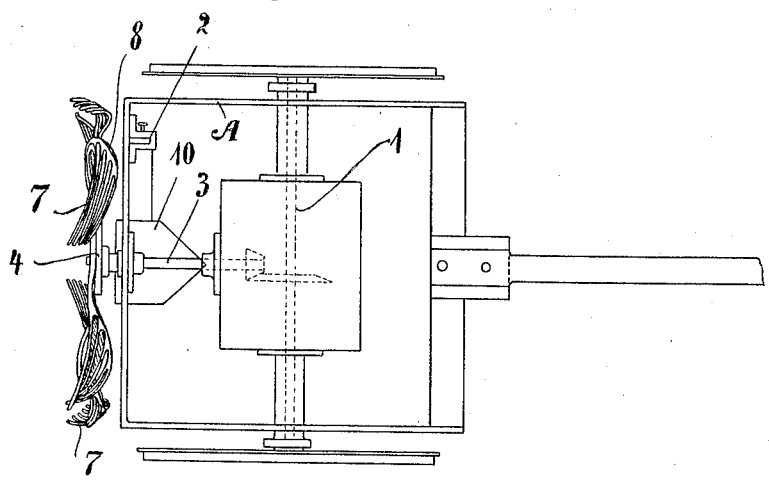

Figure 1 is a rear view of one of the arms of the revolving appliance, Fig. 2 a sideview of the same, and Fig. 3 a rear view of the whole appliance. Fig. 4 is a side view of the digger provided with the appliance, and Fig. 5 a plan-view thereof.

Referring to the drawing, the parts marked *a* are smooth, curved arms, serving for clearing away weeds. These arms project laterally from radial arms 5 fixed to a disk 4; the latter is fixed to a shaft 3 driven by bevel gear from the axle 1 of the road wheels, the disk being at the tail of the vehicular frame A of the digger, in a vertical plane perpendicular to the planes of the road wheels. The plow 10, vertically adjustable by means of a clamping device 2, is supported somewhat in front of the arms 5 and 8, in a position so that the lowest part of the circular path of the arms 8 is somewhat below the upper edge of the plow. The direction of rotation of the arms 5 is indicated by arrows in Fig. 3. The arms 8, rounded and perfectly smooth, have a helical curve or twist, relatively to the center of rotation, and are provided with parallel teeth 7, approximately like the teeth of a rake, curved and directed rearward, but somewhat inclined toward the direction in which the arms 8 project from the arms 5, so that the arms 7 trail during the rotation. The teeth 7 at the center are preferably longer than those at the sides, but this is not essential to the invention. These teeth 7 form sifting devices, for separating the tubers from the adhering earth, small weeds and the like.

The action of the apparatus is as follows: The stalks and larger weeds, such as couch grass and the like, sliding off the top of the plow, are caught by the arms 8 sweeping past the plow, and bend around said arms, along which they slide while the arms sweep upward. The arms 8 being smooth, and having no sharp corners where the arms 7 are joined to them, do not retain the caught up weed-stuff, but allow it to drop clear of the track of the plow, whereas the tubers, tumbling over the arms 8, fall through the spaces between the teeth 7 behind the plow, and are in this process freed from adhering earth and small weeds.

What I claim as my invention and desire to secure by Letters Patent of the United States is:—

1. In a potato-digger the combination, with a plow, of a plurality of arms radiating from a common center, located to the rear of said plow, means for imparting rotation to said radial arms about said center, the axis of rotation being parallel with the line of travel of the digger, arms projecting from said radial arms helically curved relatively to the axis of rotation, and parallel teeth, spaced from each other projecting rearward from said curved arms, for the purpose set forth.

2. In a potato-digger the combination, with a plow, of a plurality of arms radiating from a common center, located to the rear of said plow, means for imparting rotation to said radial arms about said center, the axis of rotation being parallel with the line of travel of the digger, arms projecting from said radial arms helically curved relatively to the axis of rotation, and parallel teeth, spaced from each other, projecting rearward from said curved arms, said teeth being inclined toward the direction in which said curved arms project from the radial arms.

In witness whereof I have signed this specification in the presence of two witnesses.

FRIEDRICH SCHULZE.

Witnesses:
ERNEST H. L. MUMMENHOFF,
IDA CHRIST. HAFERMANN.

Copies of this patent may be obtained for five cents each, by addressing the "Commissioner of Patents, Washington, D. C."